United States Patent [19]
Sokol et al.

[11] Patent Number: 5,013,222
[45] Date of Patent: May 7, 1991

[54] FUEL PUMP FOR MOTOR VEHICLE

[75] Inventors: James M. Sokol, Pontiac; Robert L. Lochmann; John G. Fischer, both of Grand Blanc, all of Mich.

[73] Assignee: General Motors Corporation, Detroit, Mich.

[21] Appl. No.: 511,131

[22] Filed: Apr. 19, 1990

[51] Int. Cl.$^5$ .................................................. F04B 35/04
[52] U.S. Cl. .................................. 417/366; 417/423.7; 123/497; 316/249
[58] Field of Search ..................... 417/283, 366, 423.7; 123/497, 499; 310/237, 247, 249

[56] References Cited

U.S. PATENT DOCUMENTS

| | | | |
|---|---|---|---|
| 3,032,735 | 5/1962 | Dingman | 310/249 X |
| 3,676,205 | 7/1972 | Schultz et al. | 417/423 |
| 3,836,291 | 9/1974 | Bottcher et al. | 417/423.7 X |
| 3,877,845 | 4/1975 | Green et al. | 417/423.7 |
| 3,898,493 | 8/1975 | Schaffer | 310/247 |
| 4,218,196 | 8/1980 | Ohnishi | 417/366 X |
| 4,352,641 | 10/1982 | Tuckey | 417/283 |
| 4,401,416 | 8/1983 | Tuckey | 417/283 |
| 4,447,192 | 5/1984 | Tuckey | 417/366 X |
| 4,498,230 | 2/1985 | Harris et al. | 310/247 X |
| 4,508,492 | 4/1985 | Kusakawa et al. | 417/366 |
| 4,728,264 | 3/1988 | Tuckey | 417/44 |
| 4,789,308 | 12/1988 | Tuckey | 417/366 X |
| 4,791,331 | 12/1988 | Girardin | 310/249 X |

FOREIGN PATENT DOCUMENTS 2162906  6/1973  Fed. Rep. of Germany ...... 417/366

Primary Examiner—Leonard E. Smith
Assistant Examiner—Eugene L. Szczecina, Jr.
Attorney, Agent, or Firm—Saul Schwartz

[57] ABSTRACT

An electric motor driven fuel pump for a motor vehicle includes a tubular metal housing, a pump in the housing at an inlet end thereof, an electric motor in the housing adjacent the pump, a plastic end cap in the housing near a discharge end thereof, and a plastic RFI module in the housing over the end cap. Brushes for the motor are disposed in brush passages in the end cap and connected to brass terminal studs press fitted into the open ends of the brush passages. The plastic RFI module completely shrouds the terminal studs on the end cap to minimize corrosion and contamination and has a pair of flat metal contact plates embedded therein. An edge of the tubular housing is crimped over the outside diameter of the RFI module and overlaps the metal contact plates so that the plates reinforce the RFI module against forces urging dislodgment of the RFI module and the end cap from the tubular housing.

3 Claims, 3 Drawing Sheets

FUEL PUMP FOR MOTOR VEHICLE

FIELD OF THE INVENTION

This invention relates to electric motor driven fuel pumps for motor vehicles.

BACKGROUND OF THE INVENTION

In common electric motor driven fuel pumps for motor vehicles, the motor is located inside a tubular metal housing between a pump at an inlet end of the housing and a plastic end cap at a discharge end of the housing. The edge of the discharge end of the housing is crimped around the end cap to retain all the internal elements of the pump. Current is conducted to the motor through brush assemblies on the plastic end cap which include brass terminal studs pressed into brush passages in the plastic end cap. The terminal studs have enlarged heads which capture and retain respective contact plates of a radio frequency interference (RFI) module which functions as an electrical connector and as a radio frequency interference suppresser. The contact plates are molded into a plastic body of the RFI module for electrical insulation from each other and include pin contacts molded into a connector body of the RFI module whereat a wiring harness is connected to the fuel pump. The headed ends of the terminal studs are necessarily exposed after the pump is assembled and, therefore, possibly susceptible to contamination and corrosion. In addition, the RFI module and the terminal studs are retained on the end cap by only the press fit of the terminal studs on the plastic end cap. In a fuel pump according to this invention, an RFI module retains a plastic end cap on the fuel pump housing and defines a reinforced shroud over the terminal studs to maximize protection against contamination and corrosion and to maximize resistance to dislodgment of the terminal studs from the end cap.

SUMMARY OF THE INVENTION

This invention is a new and improved electric motor driven fuel pump for motor vehicles including an electric motor in a tubular metal housing between a pump at an inlet end of the housing and a plastic end cap at a discharge end of the housing. Respective ones of a pair of brass terminal studs are press fitted into brush passages in the plastic end cap with elastomeric seals between the studs and the passages to prevent fuel leakage around the terminal studs. A plastic RFI module with a pair of enlarged metal plates molded therein is disposed in the discharge end of the tubular metal housing over the plastic end cap. An edge of the housing at the discharge end thereof is crimped over the RFI module to retain the module, the end cap, the motor and the pump in the housing. The RFI module completely shrouds the terminal studs and shields the latter against outside contamination and corrosion and has a pair of internal sockets which expose apertures in the metal plates. The exposed apertures in the metal plates receive the terminal studs when the RFI module is mated with the plastic end cap. The crimped-over edge of the tubular housing overlaps the outside edges of the enlarged metal plates molded in the RFI module so that the metal plates reinforce the RFI module against forces urging dislodgment of the RFI module and plastic end cap from the tubular housing and/or dislodgment of the terminal studs from the plastic end cap.

DESCRIPTION OF THE PREFERRED EMBODIMENT

Figure 1:
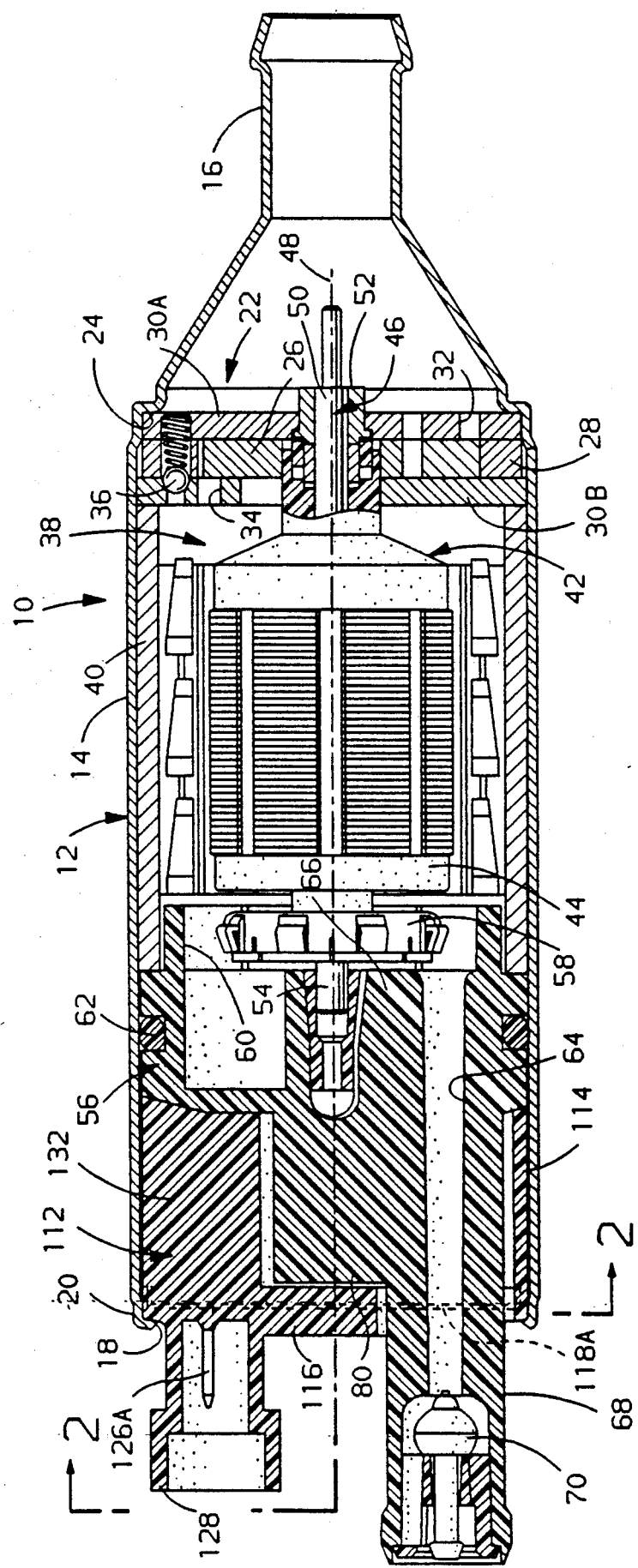
FIG. 1 is a sectional view taken generally along the longitudinal centerplane of an electric motor driven fuel pump according to this invention.

Referring to FIG. 1, an electric motor driven fuel pump 10 adapted for external mounting remote from a fuel tank of a motor vehicle includes a tubular metal housing 12 having a cylindrical wall 14. The housing also has a reduced diameter inlet end 16 which flares out to the diameter of the cylindrical wall 14 and a circular edge 18 at a discharge end 20 of the housing generally the same diameter as the cylindrical wall 14. A low pressure fuel inlet hose, not shown, from a remote fuel tank attaches to the inlet end 16.

The pump 10 further includes a conventional roller vane pump 22 seated against a shoulder 24 of the housing near inlet end 16. The roller vane pump includes a rotor 26 inside an eccentric ring 28 between a pair of side plates 30A–B. Rollers, not shown, on the rotor bear against the eccentric ring when the rotor rotates and draw fuel in from the inlet end 16 through an inlet 32 in plate 30A and discharge fuel at a higher pressure into the housing 12 through a discharge 34 in plate 30B. A relief valve 36 is available to shunt high pressure fuel back to inlet end 16.

An electric motor 38 in the housing 12 includes a field magnet assembly 40 and an armature 42. The armature includes a winding 44 on an armature shaft 46 aligned on a longitudinal centerline 48 of the housing 12. A first end 50 of the armature shaft is supported on the roller vane pump 22 at a bearing 52 for rotation about the centerline 48. A second end 54 of the armature shaft is supported on a generally cylindrical plastic end cap 56 in the housing 12 near the discharge end 20 thereof for rotation about the centerline 48. The roller vane pump rotor 26 is connected to the armature shaft 46 near the first end 50 thereof for rotation as a unit with the shaft. A commutator 58 is attached to the armature shaft 46 near the second end 54 thereof for rotation as a unit with the shaft and faces the plastic end cap 56.

Figure 2:
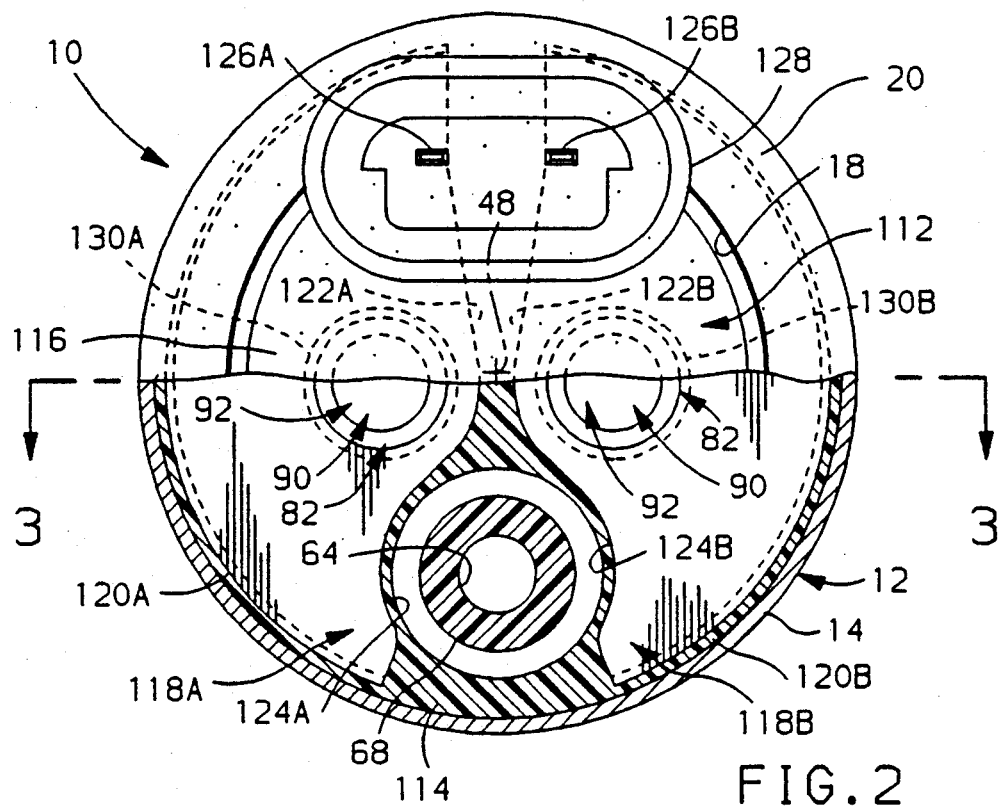
FIG. 2 is a view taken generally along the plane indicated by lines 2—2 in FIG. 1.
Figure 3:
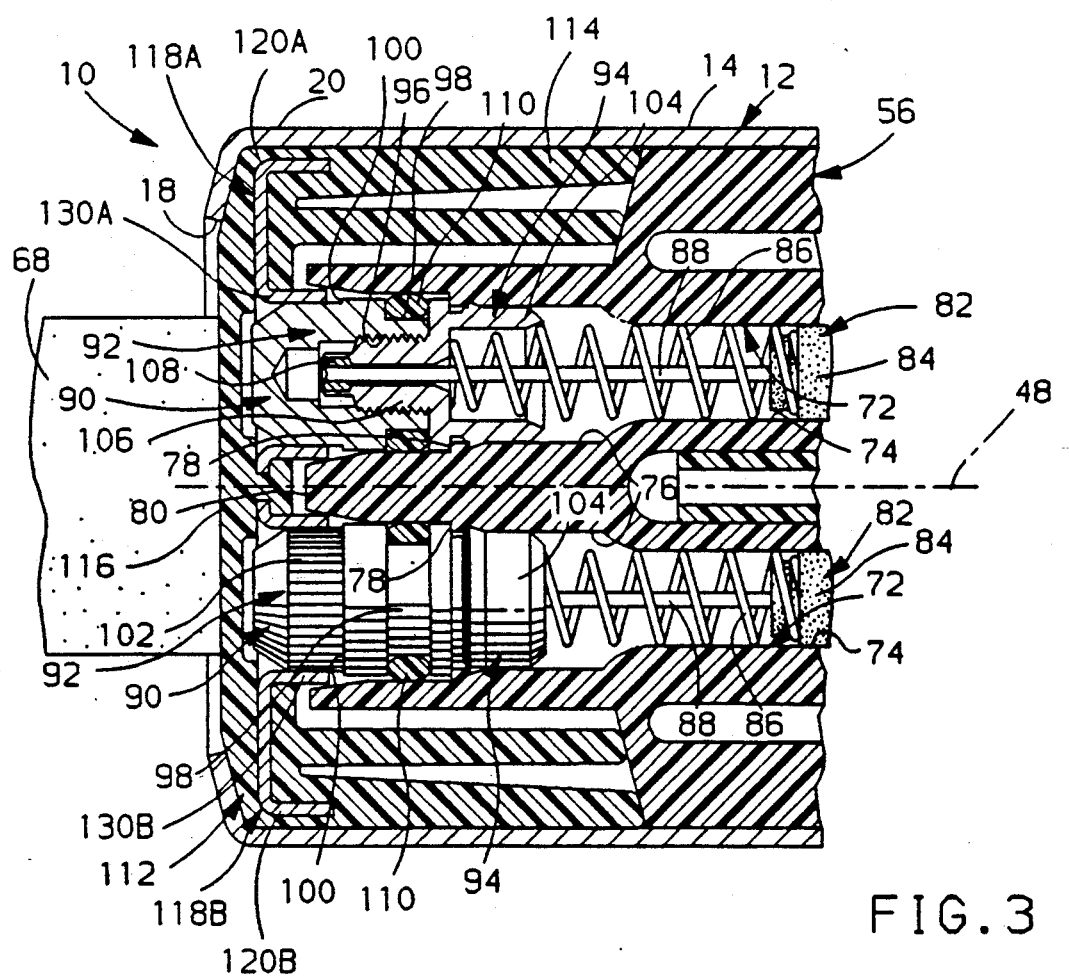
FIG. 3 is a sectional view taken generally along the plane indicated by lines 3—3 in FIG. 2.

As seen best in FIGS. 1-3, the plastic end cap 56 is closely received in the cylindrical wall 14 of the housing 12 with an annular flange 60 piloted in the field magnet assembly 40. An elastomeric seal 62 in an outside groove in the plastic end cap defines a fluid seal between the end cap and the housing to prevent high pressure fuel leakage around the end cap. The end cap 56 further includes a discharge passage 64 extending from an inside wall 66 of the end cap to the end of an integral stem 68 of the end cap. A high pressure discharge hose, not shown, attaches to the end of the stem 68 downstream of a check valve 70 in the discharge passage. The discharge passage conducts high pressure fuel from the housing to the high pressure discharge hose.

Referring particularly to FIG. 3, the plastic end cap 56 includes a pair of identical brush passages 72 extending through the end cap parallel to the centerline 48. Each passage includes a non-cylindrical portion 74 opening through the inside wall 66 of the end cap and a stepped cylindrical portion 76 having an annular shoulder 78. The cylindrical portions 76 of the passages 72 open through an outside wall 80 of the plastic end cap.

A pair of identical brush assemblies 82 are disposed in the brush passages 72. Each brush assembly includes a carbon or graphite brush 84 slidable in the direction of centerline 48 in the non-cylindrical portion 74 the corresponding passage 72, a spring 86 bearing against the brush, and a shunt wire 88 inside the spring 86 electrically connected to the brush 84. The other end of the spring 86 seats against a brass terminal stud 90 of the brush assembly. Similarly, the other end of the shunt wire 88 is soldered to the terminal stud 90.

Each terminal stud 90 is a two-piece assembly including a first or outer element 92 and a second or inner element 94. The outer element 92 is generally cup-shaped and includes a screw-threaded inside surface 96, an annular outside groove 98 adjacent the open end of the outer element, an outside annular shoulder 100 next to the groove 98, and a knurled cylindrical outside surface 102 above the shoulder 100. The inner element 94 is similarly generally cup-shaped and includes a cylindrical wall 104 with an outside barb thereon and a tubular stem 106 extending in the opposite direction from the cylindrical wall 104. The stem 106 is screw-threaded on the outside to match the threads on the inside surface 96 of the outer element.

In assembling the brush assemblies 82, the inner and outer elements 94,92 of the terminal studs 90 are initially separate. The shunt wire 88, with the spring 86 therearound, is inserted through the tubular stem 106 of the inner element from inside the cylindrical wall 104. The end of the shunt wire is soldered to the end of the stem 106 at a solder joint 108, FIG. 3. An elastomeric seal ring 110 is fitted in the annular groove 98 in the outer element 92 and the outer element is screwed onto the inner element 94 until the open end of the outer element butts against the closed end inner element for capture of the seal ring 110.

The brushes 84 are inserted into the brush passages 72 through the outside surface 80 of the plastic end cap 56 and butt against the commutator 58 on the armature shaft 46. The annular outside barbs on the inner elements of the terminal studs 90 are interference press fitted into the stepped cylindrical portions 76 of the brush passages inboard of or below the annular shoulders 78. The barbs retain the terminal studs 90 in the brush passages and the springs 86 bias the brushes against the commutator 58. When the terminal studs 90 are seated against the annular shoulders 78 in the brush passages, the knurled outside surfaces 102 of the outer elements 92 of the terminal studs are exposed through the outside surface 80 of the plastic end cap 56.

The fuel pump 10 further includes a radio frequency interference (RFI) module 112 in the housing 12 at the discharge end 20 thereof over the plastic end cap 56. The RFI module is generally cup-shaped and has a cylindrical wall 114, FIG. 3, with an outside diameter substantially equal to the diameter of the cylindrical wall 14 of the housing 12 and a circular end wall 116. The cylindrical wall 114 of the RFI module is received over a relieved portion of the plastic end cap 56, FIG. 3, and captures the end cap against the field magnet 40 in the housing 12.

As seen best in FIGS. 2-3, the RFI module 112 further includes a pair of encapsulated or molded-in semi-circular or D-shaped, flat metal contact plates 118A-B in the circular end wall 116. Each contact plate includes an arcuate outer edge 120A-B, a generally straight inner edge 122A-B, and a relief 124A-B in the inner edge 122A-B. The contact plates are arrayed in a common plane perpendicular to centerline 48 with the straight edges 122A-B facing each other and with the reliefs 124A-B flanking the stem 68 of the plastic end cap 56. The plastic of the RFI module electrically insulates the contact plates from each other.

For electrical connection to a wiring harness, a pair of terminal pins 126A-B integral with the contact plates 118A-B, respectively, project out of the circular end wall 116 of the RFI module, FIGS. 1-2, inside a connector body 128 molded integral with the RFI module. To effect connection of the contact plates 118A-B to the terminal studs 90, the circular end wall 116 of the RFI module is relieved around a pair of integral annular flanges 130A-B of the contact plates 118A-B so that the flanges are exposed from inside the cylindrical wall 114 of the RFI module. The diameters of the flanges 130A-B correspond generally to the diameters of the knurled outside surfaces of the terminal studs 90. Electronic circuitry, not shown, for suppressing radio interference is encapsulated in an enlarged portion 132, FIG. 1, of the cylindrical wall 114 of the RFI module.

The RFI module is assembled over the plastic end cap 56. The knurled outside surfaces 102 of the terminal studs 90 are received in the annular flanges 130A-B in the contact plates before the RFI module is fully seated on the end cap. The final increments of movement of the RFI module toward the end cap effect an electrically conductive, interference press fit between the terminal studs and the contact plates. The integral annular flanges 130A-B of the contact plates are aligned with the outside shoulders 100 on the terminal studs. The circular end wall 116 of the RFI module completely shrouds the ends of the terminal studs to minimize corrosion and contamination of the studs.

Following assembly of the RFI module, the edge 18 of the housing 12 is crimped, rolled or otherwise formed over the exposed side of the circular end wall of the RFI module to retain it and the other elements of the fuel pump 10 inside the housing. Importantly, the crimped-over edge 18 overlaps the circumference of the circle defined by the arcuate outer edges 120A-B of the contact plates 118A-B substantially completely around the RFI module. The contact plates thus reinforce the RFI module against internal forces urging dislodgment of the RFI module and the plastic end cap 56 from the housing 12.

Additionally, the fuel pump 10 minimizes the likelihood of fuel leakage, even in the presence of rapid, high pressure build-up in the housing 12. For example, the solder joints 108 between the shunt wires 88 and the stems 106 of the inner elements 94 of the terminal studs are exposed to potentially corrosive fuel only through a small annulus around the shunt wires. If the solder joints fail, fuel leakage across the joints and across the screw threads between the inner and outer elements of the terminal studs is stopped at the seal rings 110 around the terminal studs. Further, in the event of a rapid, high pressure build-up inside the housing 12 sufficient to dislodge the inner elements 94 of the terminal studs from the plastic end cap 56, the outside shoulders 100 on the terminal studs 90 are intercepted and retained by the integral flanges 130A-B on the contact plates 118A-B before the fluid seals defined at the rings 110 are compromised.

Figure 4:
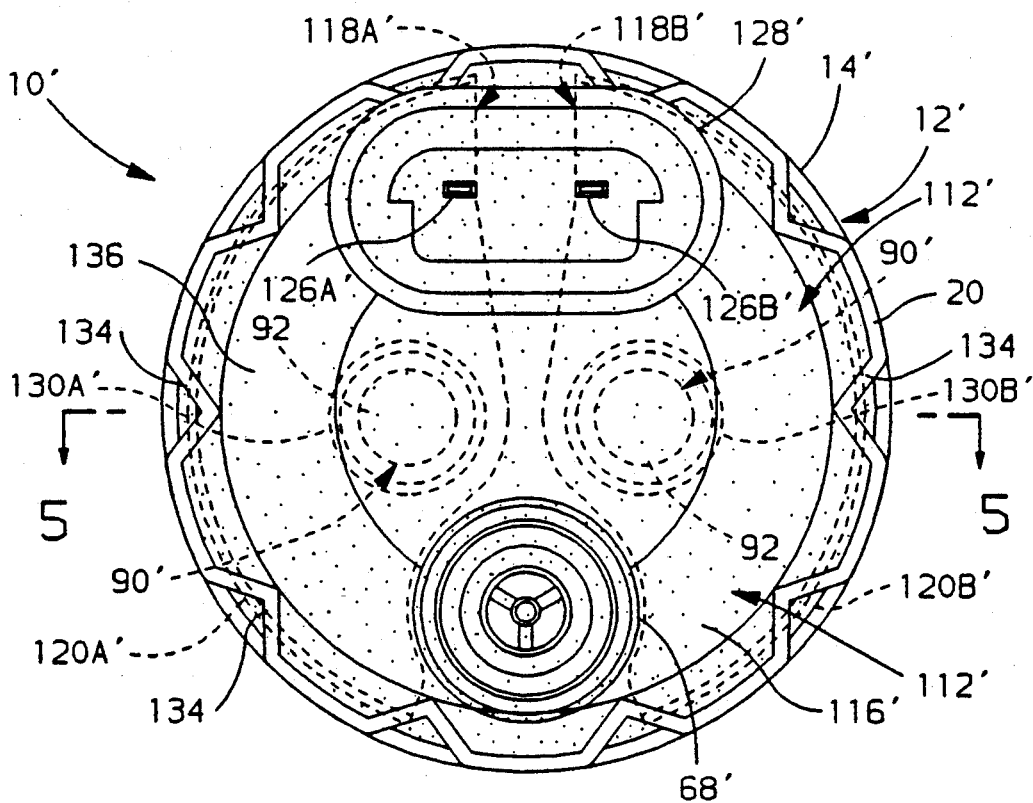
FIG. 4 is a view similar to FIG. 2 but showing a modified embodiment of the electric fuel pump according to this invention.
Figure 5:
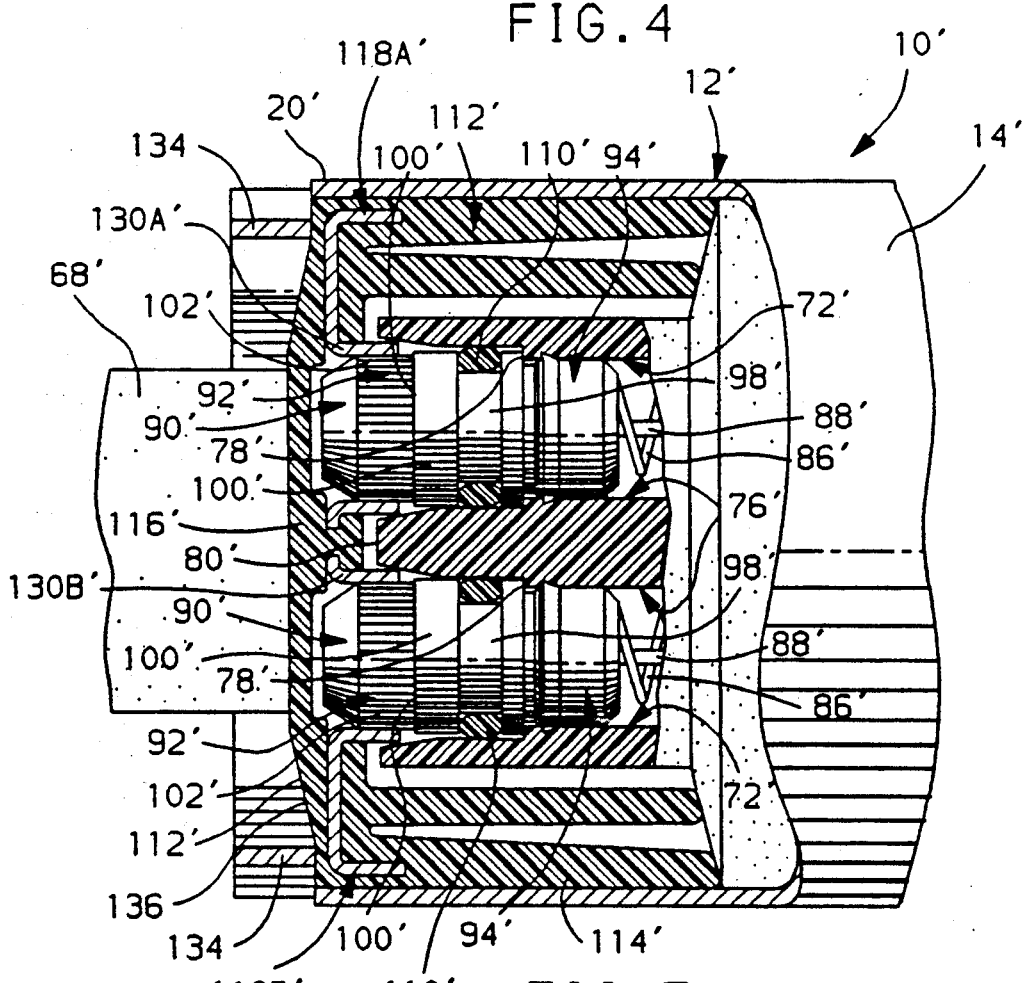
FIG. 5 is a fragmentary view taken generally along the plane indicated by lines 5—5 in FIG. 4.

Referring to FIGS. 4 and 5, a modified fuel pump 10' according to this invention is in all respects like the fuel pump 10 except at the discharge end 20' of the housing 12'. The discharge end 20' of the housing 12' is radially scalloped during final assembly to define a plurality of inwardly extending V-shaped retaining lugs 134 which bear against a conical surface segment 136 of the end wall 116' of the RFI module. The lugs overlap the circumference of the circle defined by the outside edges of the contact plates 118A'-B' in the RFI module for reinforcement as described above. In addition, tolerance stack-up associated with the internal elements of the fuel pump 10' is automatically accommodated by the inclination of the conical surface segment 136. That is, the lugs 134 project further toward the centerline of the fuel pump as the magnitude of the total tolerance stack-up decreases.

The embodiments of the invention in which an exclusive property or privilege is claimed are defined as follows:

1. In an electric motor driven fuel pump for motor vehicles including
   a tubular metal housing having an inlet end and a discharge end,
   a pump in said tubular housing adjacent said inlet end,
   a plastic end cap in said tubular housing adjacent said discharge end having a pair of brush passages therein parallel to a longitudinal centerline of said tubular housing,
   an electric motor in said tubular housing between said pump and said plastic end cap including a commutator rotatable about said longitudinal centerline,
   a pair of brushes in respective ones of said brush passages butting against said commutator,
   a pair of spring means in respective ones of said brush passages for biasing said brushes against said commutator, and
   a pair of shunt wires in respective ones of said brush passages electrically connected to said brushes,
the combination comprising:
   a pair of terminal studs each having an outside shoulder thereon and each interference press fitted in respective ones of said brush passages and electrically connected to the corresponding ones of said shunt wires,
   a pair of elastomeric seals between respective ones of said terminal studs and corresponding ones of said brush passages to prevent high pressure fuel leakage around said terminal studs from inside said tubular housing,
   a generally cup-shaped plastic RFI module closely received in said tubular housing at said discharge end thereof over and completely shrouding said terminal studs on said plastic end cap and including a pair of generally semicircular flat metal contact plates encapsulated in said RFI module in a common plane perpendicular to said longitudinal centerline of said tubular housing to define a circular reinforcement in said RFI module,
      each of said contact plates having an exposed integral annular flange interference press fitted over a respective one of said terminal studs when said RFI module is fitted over said plastic end cap and aligned with said outside shoulder on the corresponding one of said terminal studs to block withdrawal of said corresponding terminal stud from said brush passage, and
   means defining a peripherally crimped edge of said tubular housing over said RFI module around the full diameter thereof and overlapping the outside diameter of said circular reinforcement therein defined by said pair of flat metal contact plates.

2. The electric motor driven fuel pump recited in claim 1 wherein
   each of said terminal studs is a two-piece assembly including
   a first cup-shaped element open at a first end and closed at a second end and having a screw-threaded inside wall and an annular outside groove adjacent said first end, and
   a second cup-shaped element open at a first end and closed at a second end and including a tubular screw-threaded stem projecting from said second end for reception in said inside wall in said first element to close said annular groove so that said annular groove defines a seat for said elastomeric seal between said terminal stud and said brush passage,
   each of said shunt wires being received in said tubular stem of a corresponding one of said terminal studs and electrically connected to said corresponding terminal stud at an end of said tubular stem.

3. The electric motor driven fuel pump recited in claim 2 wherein
   the electrical connection between each of said shunt wires and the corresponding one of said tubular stems is a solder joint.

* * * * *